2,805,171

HIGH ACETYL CELLULOSE ACETATE MOLDING COMPOSITIONS AND THE MANUFACTURE OF MOLDED PIECES THEREFROM

Robert F. Williams, Jr., Rochester, N. Y., assignor to Eastman Kodak Company, Rochester, N. Y., a corporation of New Jersey No Drawing. Application October 1, 1954, Serial No. 459,823

6 Claims. (Cl. 106—176)

This invention relates to plasticized compositions of acetyl cellulose having high acetyl content that are adapted for formation into finished articles by conventional molding processes without the use of low boiling solvents.

Commonly, cellulose acetate is classified as either of the acetone soluble or of the acetone insoluble type. The acetone soluble type results from the acetylation of cellulose such as in an esterification bath consisting of acetic anhydride, acetic acid and sulfuric acid catalyst until substantially, completely acetylated followed by hydrolysis of the cellulose ester usually while still in dissolved form with aqueous acid until an acetone soluble product is obtained. The acetone insoluble cellulose acetates are subjected to little if any hydrolysis and are ordinarily referred to as "cellulose triacetates." The dividing point between these two types of acetates is regarded as 42.5% acetyl content or in terms of acetic acid content between 59% and 59.5%. In terms of acid radicals, it may be expressed as a degree of esterification of 2.74 acid radicals per $C_6$ cellulose unit. The cellulose triacetates are insoluble in most solvents but are soluble in methylene chloride-alcohol. The acetone soluble cellulose acetates having an acetyl content of 52.5 to 53.5% figured as percent acetic acid have been designated of the plastic type. The prior art has regarded the cellulose acetates of the triacetate type as having little if any thermoplasticity or moulding properties.

The high acetyl cellulose acetates referred to as "cellulose triacetates" are of interest because of their less susceptibility to the effects of moisture, solvents or other agents than the acetone soluble cellulose acetates. Because of these good properties and because of the difficulties involved in preparing objects from cellulose triacetates using solvents, it is of advantage to form objects therefrom without the use of solvents such as by extruding or by injection molding. However, up to the present time the forming of objects from cellulose triacetate by conventional molding operations which necessitate high temperatures has resulted in degradation of the cellulose ester giving a product which is highly discolored and often quite brittle. The melting points of cellulose triacetate compositions are considerably above those of compositions of the acetone soluble cellulose acetates of the plastic type. There have been cases where a considerable proportion of plasticizer has been mixed with the cellulose ester (see Br. 435,311) and in those cases the product obtained is soft, lacks flexural strength, has poor surface hardness, poor permanence, and is distorted at low temperatures.

Cellulose triacetate compositions containing a low-boiling solvent have been shaped such as described in Br. Patent 434,970. This, however, has several disadvantages in addition to undesirable working conditions. The products obtained are subject to shrinking both in the operation and afterwards. No previous instances where cellulose triacetate has been molded successfully are known using the usual proportion of plasticizer and the pressures and temperatures ordinarily employed in the molding art, particularly where the use of a low-boiling solvent is avoided, nor have the products obtained had a flexural strength sufficiently high for many purposes. This is in contrast to the acetone soluble cellulose acetates which have been employed for molding purposes for many years.

One object of my invention is to provide compositions of cellulose acetate of the acetone insoluble type from which may be made molded pieces of high flexural strength. Another object of my invention is to provide molding compositions of acetone insoluble cellulose acetate in which no more than the usual proportions of plasticizer are employed thus avoiding softness and weakness in the products made therefrom. A further object of my invention is to provide molding compositions of the acetone insoluble cellulose acetate type which compositions are moldable at high temperatures and pressures. A still further object of my invention is to facilitate the preparation of molded objects of acetone insoluble cellulose acetate in the absence of low boiling solvents. Other objects of my invention will appear herein.

I have found that compositions which are adapted to be molded at high pressures and temperatures can be prepared from an acetone insoluble cellulose acetate, the acetyl content of which is at least 42.7% by using 20—90, and preferably 20—60, parts of heat stable plasticizer per 100 parts of cellulose acetate provided certain critical features are observed. I have found that the molded pieces from such compositions are not appreciably discolored either in their molding or upon ageing, have a flexural strength of above 2500 p. s. i. at 77° F., good hardness and are stable and resistant to distortion by heat. My invention involves a combination of factors necessary to give compositions adapted to mold at high temperatures and pressures from an acetone insoluble high acetyl cellulose acetate. These critical factors which I have found to be critical for preparing molding compositions of this type are:

I. The high acetyl cellulose acetate should have a combined sulfur content of not more than .005 percent and a content of active ash or not more than .05 percent. By active ash is meant any active mineral compounds as contrasted to inert materials. Under this designation are included such mineral compounds as any sodium or potassium salts, calcium or magnesium oxide, hydroxide, acetate or carbonate. Compounds which are inert and which would not be included under this term are such compounds as barium sulfate, titanium dioxide, calcium or barium oxalate, or magnesium phosphate. The active ash content of the ester should not be more than .05 percent, whereas the content of inert material may be in an amount up to 5 percent, or even up to 10 percent or more, of the ester. The combined sulfur content should be not more than .005 percent, and preferably, not more than .002 percent, based on the weight of the cellulose ester. The low combined sulfur content and low active ash content may be attained by any method recognized for that purpose. Some of the methods of preparing high acetyl cellulose acetate having a combined sulfur content of not more than .005 percent and an active ash content of not more than .05 percent are as follows:

A. One method of obtaining such a cellulose ester consists of adding water to a completed cellulose acetylation bath in an amount only just sufficient to destroy the acetic anhydride therein, or to go slightly beyond this point, the system being at a temperature of at least 145° F., and then neutralizing the sulfuric acid catalyst therein, the completion of the neutralization being carried out at a temperature of at least 175° F., after which it is preferable to filter, and precipitating the cellulose acetate while at such an elevated temperature. The upper limit of temperature in this treatment is only limited by the boiling temperatures of the liquids being used, as pronouncedly hot conditions are desirable to accomplish the reduction in ash and combined sulfur in the cellulose acetate. A description of this procedure is found in U. S. Patent No. 2,596,656 of Carlton L. Crane, dated May 13, 1952, and is particularly illustrated by Example 4 of that patent. The procedure described in that patent is of value not only for reducing the content of combined sulfur and active ash but also for imparting a desirable physical form to the cellulose acetate so prepared.

B. Still another method for preparing high acetyl cellulose acetate having acceptable combined sulfur and active ash contents is by boiling precipitated high acetyl cellulose acetate in a solution of potassium iodide or oxalic acid in mineral-free or distilled water for at least one hour. A low concentration of the potassium iodide or oxalic acid is sufficient, such as from .1 percent to .5 percent thereof, although a concentration of up to 5 percent of one of those compounds may be employed. This boiling need be continued only for a sufficient time to reduce the content of combined sulfur and of active ash below the values which have been set herein.

The percentage of combined sulfur specified herein does not necessarily correspond to values for sulfur content generally, as the percentage of combined sulfur only refers to that percentage of the sulfur which is in combination in the cellulose ester and not in physical mixture therewith. To analyze for the combined sulfur in a cellulose ester, that ester may be dissolved in an organic solvent such as methylene chloride-methyl alcohol and then precipitated in aqueous acid, such as aqueous hydrochloric or acetic acid. This procedure eliminates the salts which might be physically mixed with the cellulose ester so that when a sulfur analysis is run thereon the percentage of sulfur obtained only refers to the sulfur chemically combined with the cellulose ester.

II. The high acetyl cellulose acetate used should be substantially free of acidity, as evidenced by inability to analyze for acid content in the ester (below .05 percent acid). This is accomplished by washing the acetate with distilled water, which washing operation conveniently follows the removal of combined sulfur and active ash from the acetate as the washing also removes treatment agents or soluble materials which might remain as a result of the previous treatment. For instance, if the ester has been boiled with potassium iodide, this washing operation will remove any of that salt which remains, as well as any salts which may have been loosened thereby. This operation involves washing the ester with distilled water until no acidity is found in the wash water upon analysis. This washing ordinarily would be within the range of 10 to 20 times, although the number of times of washing employed depends upon various factors. One of these factors is the physical form of the product being washed. For instance a product prepared in accordance with Crane Patent No. 2,596,656 (application Serial No. 214,170) exhibits good physical form, and washing 10 times in distilled water would be ordinarily sufficient to attain freedom from acidity in the porous product. On the other hand, in the case of cellulose acetates prepared by some methods, it would probably be desirable to wash as much as 20 times, or sometimes even more. In some cases, such as where the cellulose ester has been washed prior to a boiling treatment, its acidity content may be sufficiently low that only three or four distilled water washings would be necessary to reach a point where the acidity could not be analyzed for. Therefore, the sole criterion in this step of washing with distilled water is that acidity is reduced to a point where analysis will indicate less than .05% acid content in the washed cellulose ester.

III. Any trace of sulfate ion remaining in the cellulose acetate, whether in combined or uncombined form, is preferably inactivated by treatment with a water-soluble alkaline earth metal salt of a weak acid such as barium, magnesium or calcium formate, malate or acetate, or an alkali metal acid oxalate. This may be accomplished by adding to the cellulose ester a minute amount of such material as potassium acid oxalate, barium formate, or magnesium formate, or by boiling the ester in an aqueous solution of one of these salts. This step, although preferred, may be omitted, where the combined sulfur content of the cellulose ester is less than .002 percent, as such treatment is an aid in preserving the color of the material in the molding operation. In some cases, in the manufacture of high acetyl cellulose acetates, the ester after its precipitation is washed free of acid and then treated with an alkaline earth oxide, such as magnesium oxide. This treatment has the effect of inactivating the sulfate ion, and is equivalent to this step, even though carried out before the removal of combined sulfur from the ester. Where a water-soluble salt of the weak acid is added to the cellulose ester, it should be in such a small amount that not more than 3 moles of the salt is incorporated in the ester per mole of sulfur therein.

IV. In preparing the molding composition, at least 5 parts of the plasticizer per 100 parts of the cellulose acetate should be uniformly distributed therein. Although for the purpose of my invention it is only necessary that 5 parts of the plasticizer be uniformly distributed in the ester, as a practical matter, it is preferable to incorporate all of the plasticizer which is to be employed in the cellulose acetate in a manner giving uniformity of composition. Some of the means by which plasticizer may be uniformly distributed in the cellulose esters are as follows:

a. Adding the plasticizer to the cellulose acetate while the latter is in a wet condition. While wet, the cellulose acetate is very adsorptive, and will easily take up the plasticizer, and after the plasticizer and the wet cellulose ester are thoroughly mixed, the mass is then dried either by running over warm rolls or by means of a current of warm, dry air or a vacuum drier. It will be found that the plasticizer is uniformly distributed in the cellulose acetate as a result of this treatment.

b. Another method of uniformly distributing the plasticizer in the cellulose ester is by dissolving the plasticizer in a suitable low-boiling solvent therefor, such as acetone, methyl alcohol, or benzene, and thoroughly mixing that solution with the cellulose acetate. The acetate may then be passed between cooled rolls to distribute the plasticizer therein, following which the diluting liquid may be driven from the mass, such as by a current of warm air or by some other drying method. Instead of this procedure, however, the cellulose ester, after mixing with the solution of plasticizer, may be passed through stainless steel or nickel-plated rolls having an elevated temperature, in which operation the diluent would be driven off so that cold rolling and subsequent drying would be unnecessary. The cellulose ester material obtained has the plasticizer uniformly distributed therethrough.

c. Another method of incorporating plasticizer into the cellulose acetate is to add the plasticizer to a solution of the cellulose acetate in a low boiling solvent whereby a homogeneous mass is obtained. The solvent used may be methylene chloride-methyl alcohol (90:10) and the plasticizer may be added directly to the cellulose ester solution. The solvent is then driven off from the mass, such as by spray drying or by extruding the solution into a current of warm, dry air. The cellulose ester material thus obtained has the plasticizer uniformly distributed therein.

V. In the molding of cellulose triacetate high temperatures are necessary to obtain good flowability. Unless the effect of oxygen is inhibited at the molding temperature the molding material will be broken down or discolored or both. The effect of oxygen on the cellulose ester composition at the temperature of molding is inhibited by adding to the composition an antioxidant selected from the group consisting of the heat stable, substituted phenols having as substituents only acyclic alkyl, alkoxy or alkenyl groups, copper formate, copper acetate or the like. Some of the phenols which are useful for incorporating in cellulose triacetate molding compositions to avoid oxidation are thymol, eugenol, guaiacol, carvacrol, 2-methoxy-4-methyl phenol, dimethyl phenol, o-isopropyl phenol and tertiary butyl phenol. To obtain the antioxidant effect it is desirable to add the phenol to the composition in the proportion of at least 0.1 part per 100 parts of cellulose ester. Usually no more than 2 parts of the substituted phenol per 100 parts of acetyl cellulose is sufficient for antioxidant purposes. However, these phenols also have plasticizing properties for the cellulose triacetates and in excess act as a plasticizer either as an auxiliary to other plasticizer or as the sole plasticizing material in the composition.

Another group of compounds which are useful as antioxidants in my molding compositions are the copper salts of organic acids such as copper formate, copper acetate or the like. They need only be employed in a proportion of .0025–.1% or less based on the weight of the cellulose acetate to give the desired effect in my molding compositions.

For molding compositions in accordance with my invention an acetyl cellulose having an acetyl content of at least 2.76 acyls per $C_6$ cellulose unit and having properties as described above is mixed with plasticizer in the proportions indicated. Where acetyl is the only acyl this corresponds to a cellulose acetate having an acetyl content of at least 42.7% (see Analytical Edition, Industrial and Engineering Chemistry, vol. 18, page 547, September 15, 1946). The acetyl cellulose employed may also contain some other acyl such as propionyl or butyryl providing at least 95% of the acyl content of the ester is acetyl. Cellulose acetates which are readily prepared on a large scale are those having an acetyl content within the range of 42.7–43.7% although cellulose acetates up to substantially, fully esterfied have been found to be satisfactory. For molding operations, it is ordinarily desirable to use a cellulose acetate having a viscosity of above 30 seconds in methylene chloride-methyl alcohol (9:1), although in some cases esters of a lower viscosity could be used.

In order to obtain a product having desirable hardness, the amount of plasticizer used in my molding compositions should be restricted to a value within the range of 20–90 and preferably 20–60 parts per 100 parts of acetyl cellulose. Any of the usual cellulose acetate plasticizers which are heat stable may be employed. That a plasticizer is heat stable is evidenced when that plasticizer imparts no substantial discoloration to filter paper when heated in contact therewith for an hour at 205° C. The plasticizer may contain impurities or the like which impart the discoloration or instability upon heating. If discoloration occurs the plasticizer should either be purified or mixed with a reagent (such as a glycidyl ether) which inhibits discoloration at the elevated temperature; which ever is preferred in any given case. The following are illustrative of plasticizers which when heat stable are useful for that purpose in molding compositions in accordance with my invention: triphenyl phosphate, dimethyl phthalate, tripropionin, diethyl phthalate, methoxyethyl phthalate, triacetin, dibutyl tartrate, isopropyl phenol, octyl phenol, tertiary butyl phenol or the like.

In using compositions for molding in accordance with my invention the composition may conveniently be first heated to a plastic state, as is usual in injection molding, thus assuring satisfactory welding of the composition in the die or extrusion head. The injection molding operation is carried out at a minimum temperature of 450–550° F. At the temperature used the mass should readily weld and remain welded so as to result in products having high impact strength under optimum conditions. Impact strengths of as much as 0.5 or even more foot pounds per inch of notch are obtained.

My compositions are also adapted for use in the manufacture of extruded sheets wherein the composition is thoroughly melted and then extruded through an elongated aperture. For instance, the composition may be extruded by forcing through a cylinder at 550° F. through a slitted aperture at 500° F., where it may be formed around a steel band into a clear film. For injection molding the composition may be injection molded from a cylinder heated to 450° F.–500° F. through a .038-inch orifice heated to 500–550° F. into a die.

The following examples illustrate the preparation of molded products of acetone insoluble cellulose acetate or acetyl celluloses of the triacetate type in accordance with my invention:

*Example 1*

7.25 parts of refined cotton linters (7 parts bone dry cellulose and 0.25 part of water) were placed in a sigma bladed esterification mixer with 28 parts of acetic acid. The mass was presoaked for 30 minutes at 110° F., whereupon 15.1 parts of acetic acid were added to the mixer, and the temperature was reduced to 90° F. A mixture consisting of .07 part of 93.8 percent sulfuric acid and .66 part of acetic acid was added to the mixer, and the temperature was lowered to 66° F.

19.6 parts of 97 percent acetic anhydride (cooled to 34° F.) were added to the mixer, and the reaction temperature was maintained at 66°–68° F. for 15 minutes. The mass was then cooled to 50° F. and a mixture consisting of .44 part of 93.8 percent sulfuric acid and .8 part of acetic acid was added to the mixer, and the temperature was allowed to rise to 95° F. over one hour and 50 minutes.

When the reaction was completed, the jacket temperature of the mixer was raised to 185° F. and .35 part of magnesium carbonate was added thereto. .8 part of distilled water heated to 180°–200° F. was sprayed into the reaction mixer over a period of 20 minutes. During this time the temperature of the mass rose from 95° F. to 145° F. 1.43 parts of magnesium carbonate were added to the mixture and the temperature of the mass was raised to 170° F. The ester therein was then precipitated by adding 90 parts of distilled water at 180°–190° F. over a period of 60 minutes, which addition raised the temperature to 180° F. This treatment reduced the content of combined sulfur to below .005 percent.

The fine powder of cellulose acetate which was obtained by the precipitation was washed with successive changes of distilled water until the ester was free from any acidity. 12.4 parts of this ester containing 34.7 parts of water were mixed with 337.3 parts of distilled water and 28.2 parts of barium formate and was boiled for one hour. The excess of barium formate and water was drained from the powder and the powder was washed twice with distilled water, followed by two boilings in distilled water for one hour each, which reduced the active ash content. The powder was then centrifuged and dried. The dried ester was found to have the following upon analysis: Acetyl content—43.5 percent; combined sulfur content—0.0014 percent; active ash content—0.004 percent; viscosity in formic acid—2.03.

1. 380.3 grams (100 ester and 280.3 water) of the centrifuged powder was mixed with 0.005 gram of copper formate, 15 grams of triphenyl phosphate and 15 grams of diethyl phthalate, and after thorough mixing, the water was removed from the mass by a current of air at 140° F. The composition was compounded by rolling between chromium plated rolls heated with 80 pounds of steam, and the mass was granulated. The granules were formed, in a Watson-Stillman injection molding machine at 450° F., into film spools and impact bars. The Izod impact strength of the molded bars was 0.6 foot pound per inch of notch. It was also found that the welding properties of the composition in the film spools was good. The viscosity in formic acid of a solution of a part of the molded piece was 1.43, and the color was 8.

2. 380 grams of the centrifuged powder referred to above was mixed with 30 grams of thymol dissolved in 100 cc. of methyl alcohol. The thymol serves both as a plasticizer for the cellulose ester and an anti-oxidant. After the water and the methyl alcohol were removed from the composition by means of a current of air at 160° F., the composition was compounded on rolls heated with 80 pounds of steam, whereupon the material was reduced to the form of granules. Impact bars and film spools were prepared in a Watson-Stillman injection molding machine, as before. The impact strength of the bars was 0.8 foot pound per inch of notch, and the product was found to have welded satisfactorily and to have good surface properties. The molded pieces had a color of 6, and the viscosity in formic acid was 2.03.

*Example 2*

Five parts of undried cotton linters and 20 parts of acetic acid were mixed in a sigma-bladed esterification mixer for 30 minutes. The inside temperature of the mixer was raised to 130° F. 11.5 parts of acetic acid were added, and the mixture was then cooled to 90° F. .07 part of 93.8 percent sulfuric acid and .66 part of acetic acid were added, and the inside temperature of the mixer was cooled to 66° F. Fourteen parts of acetic anhydride were added at 35° F., and the inside temperature of the mixer was cooled to 50° F. .44 part of 93.8 percent sulfuric acid and .8 part of acetic acid were mixed and added to the mass, and the reaction was allowed to run for one hour and 50 minutes to 95° F.

The jacket temperature of the mixer was raised to 130°–140° F., and a mixture at 180°–200° F. of 5 parts of 35 percent acetic acid and 0.16 part of MgO was added to the mass. The mass was transferred to a turbo-mixer and was stirred for one-half hour, while adding 30 parts of 39 percent acetic acid at 180°–200° F. The inside temperature of the turbo mixer was raised to 165–170° F., and the ester was precipitated with 40 percent acetic acid. This treatment of the ester at a raised temperature was sufficient to lower the combined sulfur content to a point within the range satisfactory for the esters which are useful in my invention. The precipitated ester was washed free of acid with water which has been softened by means of zeolite resin, and the ester was then covered with water of this type and .0165 part of MgO and held for two hours in the wash tank. The cellulose ester was allowed to drain, whereupon the ester was centrifuged to a point where its water content was 81.5 percent and its solids content was 18.5 percent. Although the treatment described gives an ester having a low combined sulfur content, the addition of the MgO increases the content of active ash so that a further treatment is necessary for this purpose.

2,778 grams of ester as obtained after centrifuging and containing 81.5 percent water and 18.5 percent solids was boiled for one hour in 6 liters of distilled water containing 0.1 gram of potassium iodide. The ester was then washed four times with distilled water, and centrifuged to 19.5 percent solids and 80.5 percent water. A sample of the ester so obtained after drying analyzed 0.08 percent active ash, 0.005 percent sulfur, and had a viscosity of 2.81 in formic acid.

*a.* 512.8 grams of the centrifuged ester as referred to while still wet were intimately mixed with 30 grams of O-iso-propyl phenol. This material serves as both the plasticizer and the antioxidant in the composition. The water was removed from the ester by treatment with a current of warm, dry air. The composition was passed through rolls heated with 80 pounds of steam and was then granulated. The granules were molded at 440° F. into impact bars which had a color of 8 and a viscosity in formic acid of 1.95. The Izod impact strength was 0.6 foot pound per inch of notch. Some of these impact bars were further treated with formaldehyde by sealing them for 7 hours at 75°–80° F. in a mixture of one part of HCl and 5 parts of formaldehyde. These bars then were rinsed in distilled water and cured for 24 hours in an air-tight oven at 80° F. These samples were then treated for 60 hours in a current of air having a temperature of 180° F. and then submerged in a 104° F. aqueous bath for 120 hours. The weight loss through leaching and evaporating was 1.2 percent. The impact strength of the cured pieces was 1.0 foot pound per inch of notch.

*b.* 2,778 grams of the wet ester such as results from centrifuging was passed through a 10-mesh screen, boiled for 2 hours with .5 gram of oxalic acid in 6 liters of distilled water, and then boiled again for one hour in 10 liters of distilled water. The ester was boiled one hour with 0.5 gram of barium formate in 10 liters of distilled water. The ester was then centrifuged to 17.4 percent solids. A sample of this material was dried and analyzed 0.014 percent active ash and .0014 percent combined sulfur.

574.8 grams of this wet ester were uniformly mixed with 30 grams of methyl phthalate and 0.1 gram of thymol. The water was removed therefrom and the composition was compounded on hot rolls, all in a nitrogen atmosphere to minimize any effect from the oxygen of the air. The composition was then granulated and molded in a nitrogen atmosphere. The Izod impact strength of the molded material was 0.6 foot pound per inch of notch. The color of the molded piece was 6, and the viscosity in formic acid was 2.19.

The color of the molded pieces was determined by comparison with color standards to indicate the proper designation. The color was determined and tested by dissolving one gram of a sample thereof in 10 cc. of 9:1 methylene chloride-methyl alcohol, and comparing the color of the solution with standards prepared from dyes in dimethyl phthalate. These standards were prepared by dissolving 0.2 gram Ciba oil soluble yellow BB, 0.20 gram of Calcofast spirit orange R, and 0.022 gram of General Dyestuffs Alizarine Cyanine Green G Ex. Conc. in one liter of dimethyl phthalate for a stock solution. The stock solution was diluted with dimethyl phthalate in the following proportions for the designated color level:

| Color No. | Percent Stock Solution | Percent Added Dimethyl Phthalate |
|---|---|---|
| 400 | 100 | none |
| 300 | 75 | 25 |
| 200 | 50 | 50 |
| 100 | 25 | 75 |
| 75 | 18.75 | 81.25 |
| 50 | 12.5 | 87.5 |
| 40 | 10 | 90 |
| 30 | 7.5 | 92.5 |
| 20 | 5.0 | 95.0 |
| 15 | 3.75 | 96.25 |
| 10 | 2.5 | 97.5 |
| 8 | 2.0 | 98.0 |
| 6 | 1.5 | 98.5 |
| 4 | 1.0 | 99.0 |
| 2 | 0.5 | 99.5 |
| 0 | 0 | 100.0 |

Also included within the scope of my invention is the utilization in molding compositions of the acetone insoluble cellulose acetates of the triacetate type having the specified properties procured by the recovery of film scrap in which cellulose triacetate has been employed as the base. This scrap may be processed, for instance, by removing the photographic gelatin emulsion layer with enzyme or hot water and then removing the subbing layer (usually a cellulose nitrate) with a solvent such as acetone-water (2:3), methyl alcohol or the like, by treating with $KMnO_4$—$H_2SO_4$ as described in U. S. Patent No. 2,337,880 of Fordyce and Stampfli or by heating the scrap from 130° C. up to 180° C. gradually over a period of 1 or 2 hours whereby the nitrate layer is removed. The scrap is thoroughly washed to assure an active ash content below .05%. The product obtained is acetone insoluble cellulose acetate of the triacetate type having the required properties and a content of plasticizer resulting from its use in the preparation of film base. If any additional plasticizer is desired it is incorporated in the recovered scrap while wet and still in a swollen condition together with a phenol or copper salt antioxidant as provided herein. The composition is then dried and suitable for molding.

The following examples illustrate the molding of compositions of cellulose triacetate recovered from film scrap in accordance with my invention:

Example 3

Film scrap having a base of a 43.5 percent acetyl cellulose acetate and from which the photographic emulsion had been removed was subjected to a washing treatment with acetone-water (40 percent acetone) and was thoroughly washed with distilled water. The recovered film base was composed of high acetyl cellulose acetate having a combined sulfur content of approximately .002 percent, an active ash content of less than .05 percent, and gave no evidence of acidity, which ester also contained 15 parts of triphenyl phosphate per 100 of ester. A composition was prepared of the following composition while the ester was still wet: 300 parts film base (dry weight); 45 parts dimethyl phthalate; 1.5 parts thymol; .5 part hydroquinone diglycidyl ether.

The composition was rolled by passing through rolls heated to 180° C. by steam, whereby the moisture was removed and uniform mixing was obtained. The composition was then injection molded, with the cylinder at 450° F., using a .038-inch orifice at a temperature of 525°–575° F., into film spools and impact bars. The film spools show good welding properties and surface appearance. The impact strength of the bars is 0.5 foot pound per inch of notch.

Example 4

Cellulose acetate film base scrap prepared from film scrap from which the gelatin emulsion had been removed by means of pancreatin and from which the subbing layer had been removed by means of $KMnO_4$—$H_2SO_4$, as described in U. S. Patent No. 2,337,880, and which was then thoroughly washed with mineral-free water so that the combined sulfur content of the cellulose ester was less than .005 percent, its active ash content was less than .05 percent, and showed no acidity, which film base scrap, comprised of 100 parts of cellulose acetate, of 43.4 percent acetyl and 15 parts of triphenyl phosphate, was employed while still wet in preparing the following composition:

200 parts film base scrap (dry weight)
30 parts dimethyl phthalate
.05 part copper formate The composition was dried and mixed until uniform by rolling through rolls heated to 180° C. The composition was then injection molded using a .038-inch orifice at 525°–600° F. and with the cylinder at 450° F., into film spools and impact bars. The impact strength of the bars was 0.5 foot pound per inch of notch. The spools showed good welding properties and excellent surfaces.

The molded articles prepared from compositions in accordance with my invention are all characterized by good impact strength and by a flexural strength of above 2,500 pounds per square inch at 77° F. Not only are these molded articles initially of good color, but also, they are resistant to degradation such as by the effect of ageing or light, so that the color is retained and the articles do not exhibit brittleness either when first prepared or upon storage for a period of time. The molded pieces prepared in accordance with my invention have a good surface hardness and are not distorted by the use of moderately elevated temperatures or by the effect of high humidities or a variation of humidities from time to time. In the preparation of molded articles in accordance with my invention, the operator may, if desired, add dyes or pigments thereto so as to give articles having the surface appearance desired.

The viscosities of the cellulose esters in formic acid designated herein were determined on .25 percent solutions of the esters in formic acid at 25° C. This method of determining viscosities is that described in the article by Wagner and Russell, Industrial Engineering Chemistry, Analytical Edition, 20, 151–5 (1948). Formic acid is a convenient solvent for dissolving the cellulose ester in very diluted concentration, and if desired, other solvents might be employed for this purpose. The cellulose esters which are suitable for use in compositions in accordance with my invention may be not only cellulose acetates having high acetyl as the acid radicals therein, but also esters of a corresponding degree of esterification in which a small proportion (such as 5 percent or less) of propionyl or butyryl might be present.

This application is a continuation in part of my application Ser. No. 222,166, filed April 20, 1951, entitled "High Acetyl Cellulose Acetate Molding Compositions and Manufacture of Molded Pieces Therefrom."

I claim:

1. A composition adapted to be molded in the absence of volatile solvent at high pressure and temperature without any appreciable discoloration or degradation, essentially consisting of 100 parts of an acetyl cellulose having a degree of esterification of at least 2.76 acyl groups per $C_6$ cellulose unit, at least 95% of the acyl content being acetyl, a combined sulfur content of not more than .005%, an active ash content of not more than .05% and substantial freedom from acidity, 20–90 parts of a heat stable plasticizer selected from the group consisting of triphenyl phosphate, dimethyl phthalate and octyl phenol, at least 5 parts of which plasticizer is uniformly distributed throughout the acetyl cellulose and sufficient of a substituted phenol selected from the group consisting of p-tertiary butyl phenol, thymol, 2-methoxy-4-methyl phenol and eugenol to inhibit the effect of oxygen on the composition under molding conditions, from which composition molded products can be obtained having good permanence, color and hardness and a flexural strength of at least 2500 p. s. i.

2. A composition adapted to be molded in the absence of volatile solvent at high temperature and pressure without appreciable discoloration or degradation, essentially consisting of 100 parts of cellulose acetate having an acetyl content of at least 42.7%, a combined sulfur content of not more than .005%, an active ash content of not more than .05% and substantial freedom from acidity, 20–90 parts of a heat stable plasticizer selected from the group consisting of triphenyl phosphate, dimethyl phthalate and octyl phenol, at least 5 parts of which plasticizer is uniformly distributed throughout the acetyl cellulose and sufficient of a substituted phenol selected from the group consisting of p-tertiary butyl phenol, thymol, 2-methoxy-4-methyl phenol and eugenol to inhibit the effect of oxygen on the composition under molding conditions, from which composition molded products can be obtained having good permanence, color and hardness and a flexural strength of at least 2500 p. s. i.

3. A composition adapted to be molded in the absence of volatile solvent at high pressure and temperature without any appreciable discoloration or degradation, essentially consisting of 100 parts of cellulose acetate having an acetyl content of at least 42.7%, a combined sulfur content of not more than .005%, an active ash content of not more than .05% and substantial freedom from acidity, 20–90 parts of a heat stable plasticizer selected from the group consisting of triphenyl phosphate, dimethyl phthalate and octyl phenol and sufficient p-tertiary butyl phenol to inhibit the effect of oxygen on the composition under molding conditions from which composition molded products can be obtained having good permanence, color and hardness and a flexural strength of at least 2500 p. s. i.

4. A composition adapted to be molded in the absence of volatile solvent at high pressure and temperature without any appreciable discoloration or degradation, essentially consisting of 100 parts of cellulose acetate having an acetyl content of at least 42.7%, a combined sulfur content of not more than .005%, an active ash content of not more than .05% and substantial freedom from acidity, 20–90 parts of a heat stable plasticizer selected from the group consisting of triphenyl phosphate, dimethyl phthalate and octyl phenol and sufficient thymol to inhibit the effect of oxygen on the composition under molding conditions from which composition molded products can be obtained having good permanence, color and hardness and a flexural strength of at least 2500 p. s. i.

5. A composition adapted to be molded in the absence of volatile solvent at high pressure and temperature without any appreciable discoloration or degradation, essentially consisting of 100 parts of cellulose acetate having an acetyl content of approximately 43.5%, a combined sulfur content of approximately 0.0014%, an active ash content of approximately 0.004% and substantial freedom from acidity, 20–60 parts of dimethyl phthalate, at least 5 parts of which is uniformly distributed throughout the cellulose ester and sufficient thymol to inhibit the effect of oxygen on the composition under molding conditions.

6. A composition adapted to be molded in the absence of volatile solvent at high pressure and temperature without any appreciable discoloration or degradation, essentially consisting of 100 parts of cellulose acetate having an acetyl content of approximately 43.5%, a combined sulfur content of approximately 0.0014%, an active ash content of approximately 0.004% and substantial freedom from acidity, 20–60 parts of dimethyl phthalate, at least 5 parts of which is uniformly distributed throughout the cellulose ester and sufficient p-tertiary butyl phenol to inhibit the effect of oxygen on the composition under molding conditions.

References Cited in the file of this patent
UNITED STATES PATENTS

| | | |
|---|---|---|
| 1,631,468 | Carroll | June 7, 1927 |
| 2,303,339 | Dreyfus | Dec. 1, 1942 |
| 2,333,577 | Koch | Nov. 2, 1943 |
| 2,339,452 | Bailey | Jan. 18, 1944 |
| 2,558,047 | Gloor | June 26, 1951 |
| 2,561,892 | Van Wyck | July 24, 1951 |